(12) United States Patent
Shirai et al.

(10) Patent No.: US 9,840,138 B2
(45) Date of Patent: Dec. 12, 2017

(54) VEHICLE VIBRATION SUPPRESSING STRUCTURE

(71) Applicant: TOYOTA JIDOSHA KABUSHIKI KAISHA, Toyota-shi (JP)

(72) Inventors: Yasuhiro Shirai, Toyota (JP); Wenfeng Li, Nisshin (JP); Weining Wu, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/216,269

(22) Filed: Jul. 21, 2016

(65) Prior Publication Data

US 2017/0066313 A1    Mar. 9, 2017

(30) Foreign Application Priority Data

Sep. 7, 2015  (JP) ................. 2015-176140

(51) Int. Cl.
| | |
|---|---|
| *B62D 21/11* | (2006.01) |
| *B60K 1/04* | (2006.01) |
| *F16F 1/37* | (2006.01) |
| *B60L 11/18* | (2006.01) |

(52) U.S. Cl.
CPC .............. *B60K 1/04* (2013.01); *F16F 1/37* (2013.01); *B60K 2001/0405* (2013.01); *B60K 2001/0438* (2013.01); *B60L 11/18* (2013.01); *B60L 11/1877* (2013.01)

(58) Field of Classification Search
CPC ........ B62D 21/11; B62D 27/04; B62D 25/20; B62D 25/2072; B62D 25/2054; B60K 1/04

USPC ......................................... 296/193; 180/68.5
See application file for complete search history.

(56) References Cited

U.S. PATENT DOCUMENTS

| 5,339,745 A | * | 8/1994 | Ritzl ................... B60G 99/00 105/422 |
| 5,540,880 A | * | 7/1996 | Horiki ................ B05B 15/045 264/553 |
| 5,849,122 A | * | 12/1998 | Kenmochi .......... B60R 13/0815 156/182 |

(Continued)

FOREIGN PATENT DOCUMENTS

| JP | H01-070647 U | 5/1989 |
| JP | H01-119485 A | 5/1989 |

(Continued)

*Primary Examiner* — Jeffrey J Restifo
(74) *Attorney, Agent, or Firm* — Oblon, McClelland, Maier & Neustadt, L.L.P.

(57) ABSTRACT

A vehicle vibration suppressing structure includes a floor panel, a storage section, and a vibration suppressing section. The floor panel includes a general portion that extends in a vehicle front-rear direction and a vehicle width direction, and a floor pan that is provided contiguously to the general portion and that is formed in a concave shape indented toward a vehicle lower side. The storage section that covers the floor pan as viewed from a vehicle upper side is attached to the general portion, and is capable of storing a storage object. The vibration suppressing section is disposed between a lower face of the storage section and a bottom wall portion of the floor pan in a state of contact with the lower face and the bottom wall portion.

6 Claims, 6 Drawing Sheets

(56) References Cited

U.S. PATENT DOCUMENTS

| | | | | |
|---|---|---|---|---|
| 6,318,796 | B1* | 11/2001 | Felsen | B60H 1/0055 |
| | | | | 296/208 |
| 6,966,592 | B2* | 11/2005 | Harima | B60R 5/04 |
| | | | | 296/193.07 |
| 7,011,359 | B2* | 3/2006 | Watanabe | B62D 25/20 |
| | | | | 296/187.08 |
| 2003/0111834 | A1* | 6/2003 | Ledesma | B62D 21/11 |
| | | | | 280/788 |
| 2004/0174046 | A1* | 9/2004 | Kamura | B62D 25/2036 |
| | | | | 296/193.07 |
| 2005/0264041 | A1* | 12/2005 | Sugihara | B60R 13/083 |
| | | | | 296/193.07 |
| 2005/0285432 | A1* | 12/2005 | Sugihara | B60R 13/083 |
| | | | | 296/193.07 |
| 2006/0220420 | A1* | 10/2006 | Doi | B62D 25/20 |
| | | | | 296/193.07 |
| 2010/0013255 | A1* | 1/2010 | Mantovani | G10K 11/168 |
| | | | | 296/1.03 |
| 2010/0060038 | A1* | 3/2010 | Takakura | B60R 13/083 |
| | | | | 296/193.07 |
| 2010/0156146 | A1* | 6/2010 | Matsuyama | B62D 25/2036 |
| | | | | 296/193.07 |
| 2010/0196736 | A1* | 8/2010 | Boger | B32B 15/08 |
| | | | | 428/621 |
| 2017/0066313 | A1* | 3/2017 | Shirai | B60K 1/04 |

FOREIGN PATENT DOCUMENTS

| | | |
|---|---|---|
| JP | 2002-205556 A | 7/2002 |
| JP | 2011-246084 A | 12/2011 |
| JP | 2013-43464 | 3/2013 |
| JP | 2013-107592 | 6/2013 |

* cited by examiner

VEHICLE VIBRATION SUPPRESSING STRUCTURE

CROSS-REFERENCE TO RELATED APPLICATION

This application claims priority under 35 USC 119 from Japanese Patent Application, No. 2015-176140 filed Sep. 7, 2015, the disclosure of which is incorporated by reference herein in its entirely.

BACKGROUND

Technical Field

Preferred embodiments relate to a vehicle vibration suppressing structure that suppresses vibrations in a floor pan provided at a floor panel.

Related Art

JP2013-043464A describes an invention related to a resonance preventing structure. In this resonance preventing structure, a storage box (storage section) that stores tools and the like (storage objects) is accommodated in a floor pan provided at a floor panel. Accordingly, a bottom wall portion of the floor pan is pressed by the load of the storage section and the storage objects stored therein, and vibrations can be suppressed from occurring in the floor pan.

However, in the case of the related art described by JP-A No. 2013-043464, when the storage section is a size not storable in the floor pan, there is no longer anything to press the bottom wall portion of the floor pan, and it becomes difficult to suppress vibrations from occurring in the floor pan.

SUMMARY

In consideration of the above circumstances, an object of preferred embodiments is to obtain a vehicle vibration suppressing structure capable of suppressing vibrations from occurring in a floor pan even when a storage section that stores storage objects has a size that is not storable in the floor pan.

A vehicle vibration suppressing structure of a first aspect of the disclosure includes: a floor panel configuring part of a vehicle body and including a general portion that extends in a vehicle front-rear direction and in a vehicle width direction, and a floor pan that is provided contiguously to the general portion and that is formed in a concave shape indented toward a vehicle lower side; a storage section that covers the floor pan as viewed from a vehicle upper side, that is attached to the general portion, and that is capable of storing a storage object; and a vibration suppressing section that is disposed between a lower face of the storage section and a bottom wall portion of the floor pan in a state of contact with the lower face and the bottom wall portion.

According to the first aspect, the floor panel configuring part of the vehicle body includes the general portion that extends in the vehicle front-rear direction and in the vehicle width direction, and the floor pan that is provided contiguously to the general portion. The floor pan is formed in a concave shape indented toward the vehicle lower side. Various members can therefore be stored inside the floor pan.

For example, it is conceivable to store the storage section, which is capable of storing the storage object, in the floor pan. In such a configuration, the bottom wall portion of the floor pan is pressed by the load of the storage section and the storage object stored therein, and, as a result, vibrations can be suppressed from occurring in the floor pan. However, in cases in which the storage section is a size not storable in the floor pan, there is no longer anything to press the bottom wall portion of the floor pan, and it becomes difficult to suppress vibrations from occurring in the floor pan.

In the first aspect, the storage section covers the floor pan and is attached to the general portion of the floor panel as viewed from the vehicle upper side. Namely, in the present invention, although the capacity of the storage section may be set larger than in cases in which the storage section is a size storable in the floor pan, it becomes difficult to directly press the bottom wall portion of the floor pan using the storage section.

In the first aspect, the vibration suppressing section is disposed between the lower face of the storage section and the bottom wall portion of the floor pan, in a state of contact with the lower face and the bottom wall portion. The storage section can therefore press the bottom wall portion of the floor pan through the vibration suppressing section. Note that the storage section is not limited to covering the entire floor pan; storage sections that cover a portion of the floor pan are also encompassed.

A vehicle vibration suppressing stricture of a second aspect of the disclosure is, in the first aspect, the floor pan further includes a surrounding wall portion that extends toward the vehicle lower side from a boundary between the floor pan and the general portion, and that configures a surrounding wall of the floor pan, and a curved wall portion that is formed contiguously to each of the surrounding wall portion and the bottom wall portion, and that is curved so as to bulge toward the outer side of the floor pan. A lower face of the vibration suppressing structure is in face contact with the curved wall portion.

According to the second aspect, the floor pan includes the surrounding wall portion that configures the surrounding wall of the floor pan, and the curved wall portion that is formed contiguously to each of the surrounding wall portion and the bottom wall portion. The surrounding wall portion extends toward the vehicle lower side from the boundary between the floor pan and the general portion of the floor panel, and the curved wall portion is curved so as to bulge toward the outer side of the floor pan. The curved wall portion is primarily influenced by vibrations in the vehicle up-down direction generated in the bottom wall portion, and vibrations in the vehicle front-rear direction and the vehicle width direction generated in the surrounding wall portion.

Thus, in the second aspect, the storage section can press the bottom wall portion and the curved wall portion of the floor pan through the vibration suppressing section since the lower face of the vibration suppressing section is in face contact with the curved wall portion of the floor pan. As a result, reaction forces can be given counter to vibrations in the floor pan in various directions.

A vehicle vibration suppressing structure of a third aspect of the disclosure is, in the first aspect or the second aspect, the vibration suppressing section is constituted from a resin, and plural projections are provided at an upper face of the vibration suppressing section so as to project out from the upper face, and the plural projections abut the lower face of the storage section.

According to the third aspect, weight can be reduced compared to cases in which the vibration suppressing section is constituted from a metal or the like since the vibration suppressing section is constituted from a resin. Moreover, contact pressure between the lower face of the storage section and the upper face of the vibration suppressing section is increased compared to cases in which the upper face is configured as a planar face, since the plural projections are provided at the upper face of the vibration suppressing section so as to project out from the upper face, and the projections abut the lower face of the storage section. As a result, in a state in which the lower face of the storage section and the upper face of the vibration suppressing section are in contact, movement of the upper face relative to the lower face is suppressed.

A vehicle vibration suppressing structure of a fourth aspect of the disclosure is, in any one of the first aspect to the third aspect, the stored storage object is plural battery modules that configure a vehicle mounted battery, and the storage section is a storage case that stores the battery modules.

According to the fourth aspect, the vehicle mounted battery is configured including the plural battery modules and the storage case that stores the battery modules. The vehicle mounted battery can therefore be employed as a power source for a hybrid car or a plugin hybrid car.

The bottom wall portion of the floor pan can therefore be pressed by the load of the vehicle mounted battery in cases in which the vehicle mounted battery is a size not storable in the floor pan, and, as a result, vibrations can be suppressed from occurring in the floor pan.

However, in cases in which the vehicle mounted battery has a large physical volume, like those employed in plugin hybrid cars, it is conceivable that it would be difficult to store the vehicle mounted battery in the floor pan, and that, as a result, it would be difficult to suppress vibrations from occurring in the floor pan. Although it is conceivable that the floor pan could be configured capable of storing vehicle mounted batteries of large physical volume, this would require modifying the configuration of the floor pan, and thus the vehicle body.

In the fourth aspect, the storage case, which configures the vehicle mounted battery, can press the bottom wall portion of the floor pan through the vibration suppressing section. This enables vibrations to be suppressed from occurring in the floor pan without changing shape of the floor pan, even when the vehicle mounted battery is a size not storable in the floor pan.

A vehicle vibration suppressing structure of the fifth aspect of the disclosure is, in any one of the first aspect to the fourth aspect, the vibration suppressing section is disposed in a position abutting a vehicle width direction central portion of the curved wall portion of the floor pan.

A vehicle vibration suppressing structure of a sixth aspect of the disclosure is, in any one of the second aspect to the fifth aspect, the vibration suppressing section includes a lower side abutting portion, and a pair of upper side abutting portions abutting the storage section; the lower side abutting portion includes a bottom wall region, and a curved wall portion side abutting region extending upwards from the bottom wall region; and the curved wall portion side abutting region is disposed at a position abutting a vehicle width direction central portion of a curved wall portion of the floor pan, the lower face of the curved wall portion side abutting region is in face contact with the curved wall portion of the floor pan, and the bottom wall region is mounted on the bottom wall portion of the floor pan.

Since large vibrations are generally liable to be generated in the vehicle width direction central portion of the curved wall portion of the floor pan, this portion is configured to abut the vibration suppressing section in the fifth aspect. In the sixth aspect, the curved wall portion side abutting region of the vibration suppressing section is configured to abut the vehicle width direction central portion of the curved wall portion of the floor pan. Such a configuration increases the effectiveness of suppressing vibrations in the floor pan using the vibration suppressing section, and enables the vibration suppressing section to be smaller in scale.

A vehicle vibration suppressing structure of a seventh aspect of the disclosure is, in the vehicle vibration suppressing structure of any one of the third aspect to the fifth aspect, the vibration suppressing section includes a lower side abutting portion, and a pair of upper side abutting portions abutting the storage section. The lower side abutting portion is formed in a block shape having a substantially uniform thickness in the vehicle front-rear direction and in the vehicle width direction, and the lower face of the lower side abutting portion is in face contact with the curved wall portion of the floor pan. Plural projections are provided at an upper face of the pair of upper side abutting portions so as to project out from the upper face, and horizontal dimensions of the pair of upper side abutting portions are gradually widen in the vehicle forward direction and in the vehicle width direction from respective leading end portions of the upper side abutting portions toward the lower side abutting portion.

According to the seventh aspect, the lower side abutting portion of the vibration suppressing section is a block shape having substantially uniform thickness in the vehicle front-rear direction and the vehicle width direction, and each of the pair of upper side abutting portions has horizontal dimensions that gradually widen in the vehicle forward direction and in the vehicle width direction from respective leading end portions of the upper side abutting portions toward the lower side abutting portion. The pressing force from the storage section therefore can be suppressed from acting unevenly on the lower face of the lower side abutting portion.

A vehicle vibration suppressing structure of an eighth aspect of the disclosure is, in the vehicle vibration suppressing structure of the seventh aspect, the plural projections include first plural ribs that extend along the vehicle front-rear direction and that have triangular shapes as viewed in vertical cross-section at an upper face of either one of the pair of upper side abutting portions; and the plural projections include second plural ribs that extend along the vehicle width direction and that have triangular shapes as viewed in vertical cross-section at an upper face of the other upper side abutting portion.

In the eighth aspect, contact pressure between the lower face of the storage section and the upper face of the upper side abutting portion can be increased since the ribs are formed in triangular shapes as viewed in vertical cross-section. The ribs provided at the either one upper side abutting portion extend in the vehicle front-rear direction. The either one upper side abutting portion therefore easily receives resistive force from the storage section when moving relative to the storage section in the vehicle width direction. The ribs provided at the other upper side abutting portion extend in the vehicle width direction. The other upper side abutting portion therefore easily receives resistive force from the storage section when moving relative to the storage section in the vehicle front-rear direction. Accordingly, when the floor pan vibrates, resistive force received from the storage section by the pair of upper side abutting portion is exerted in mutually different directions, enabling the attachment position of the vibration suppressing section to be suppressed from being offset by vibration of the floor pan.

As explained above, the vehicle vibration suppressing structure of the first aspect of the present disclosure has an excellent advantageous effect of suppressing vibrations from occurring in the floor pan even when the storage section that stores the storage object is a size not storable in the floor pan.

The vehicle vibration suppressing structure of the second aspect of the present disclosure has an excellent advantageous effect of stabilizing and suppressing vibrations from occurring in the floor pan, even when the vibrations in various directions are generated.

The vehicle vibration suppressing structure of the third aspect of the present disclosure has an excellent advantageous effect of reducing the influence of the weight of the vibration suppressing section on vibrations in the floor pan, and suppressing generation of abnormal noise clue to the lower face of the storage section rubbing against the upper face of the vibration suppressing section.

The vehicle vibration suppressing structure of the fourth aspect of the present disclosure has an excellent advantageous effect of suppressing vibrations from occurring in the floor pan without modifying the configuration of the floor pan, even when a vehicle mounted battery of large physical volume has been employed.

The vehicle vibration suppressing structures of the fifth aspect and the sixth aspect of the present disclosure enable vibrations to be effectively suppressed from occurring in the floor pan.

The vehicle vibration suppressing structure of the seventh aspect of the present disclosure enables vibrations to be further suppressed from occurring in the floor pan.

The vehicle vibration suppressing structure of the eighth aspect of the present disclosure enables the attachment position of the vibration suppressing section to be suppressed from being offset by vibrations of the floor pan.

BRIEF DESCRIPTION OF THE DRAWINGS

Preferred embodiments will be described in detail based on the following figures, wherein.

DETAILED DESCRIPTION

First Exemplary Embodiment

Explanation follows regarding a vehicle vibration suppressing structure according to a first exemplary embodiment of the present invention, with reference to FIG. 1 to FIG. 4. In each of the drawings, an arrow FR indicates a vehicle front side, an arrow UP indicates a vehicle upper side, and an arrow OUT indicates a vehicle width direction outside where appropriate.

Figure 4:
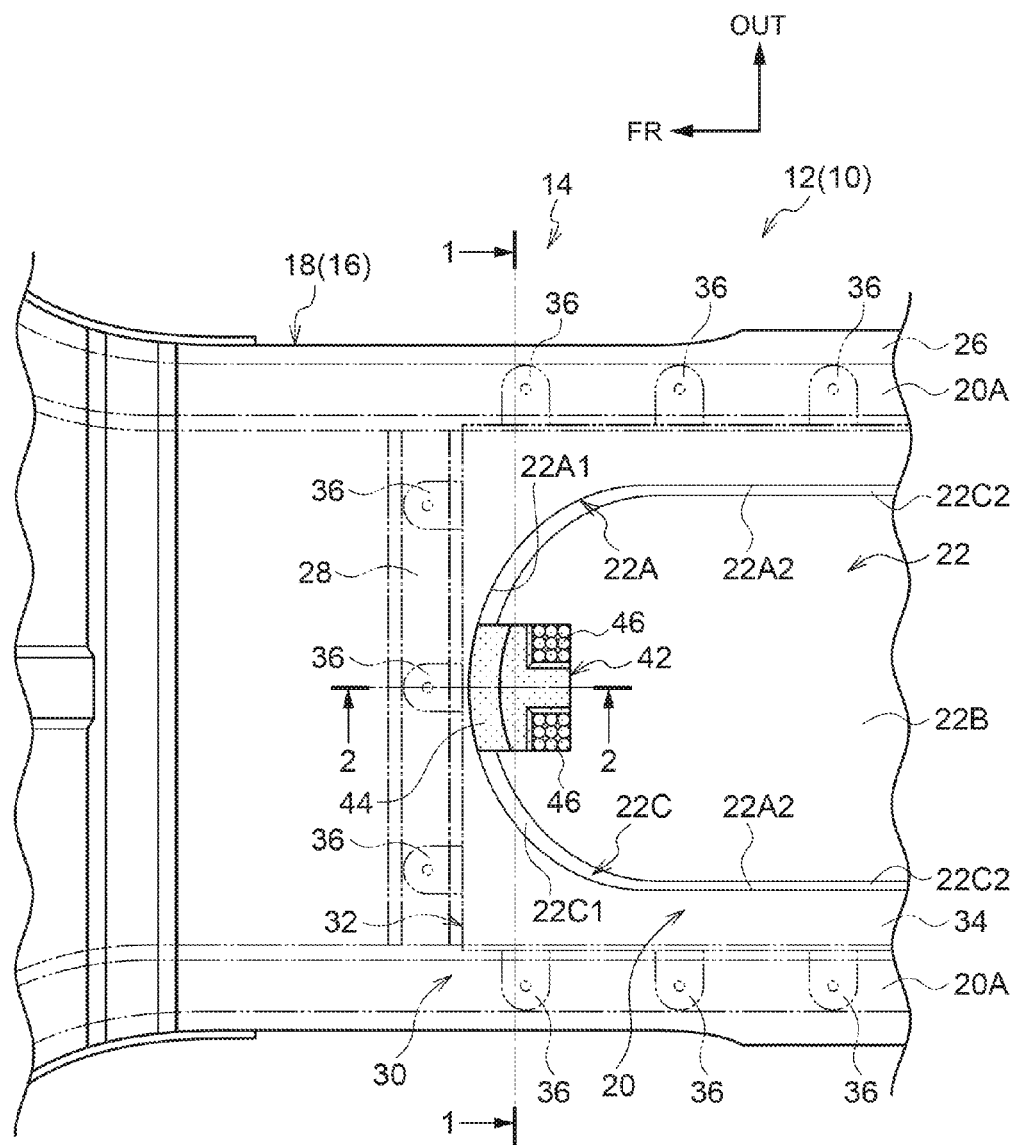
FIG. 4 is a plan view of a vehicle rear section applied with a vehicle vibration suppressing structure according to the first exemplary embodiment viewed from a vehicle upper side.

First, explanation follows regarding a configuration of a vehicle body rear section 14 of a vehicle 10 applied with a vehicle vibration suppressing structure according to the first exemplary embodiment of the present invention, with reference to FIG. 4. The vehicle body rear section 14 configures part of a vehicle body 12 of the vehicle 10. The vehicle body rear section 14 is configured including a rear floor panel 18 serving as a floor panel that constructs part of the vehicle rear side of a floor portion 16 of the vehicle body 12. The rear floor panel 18 is formed by pressing a steel plate, and is shaped including a general portion 20 that extends in a vehicle front-rear direction and a vehicle width direction, and a floor pan 22 that is contiguously provided at the general portion 20.

Figure 1:
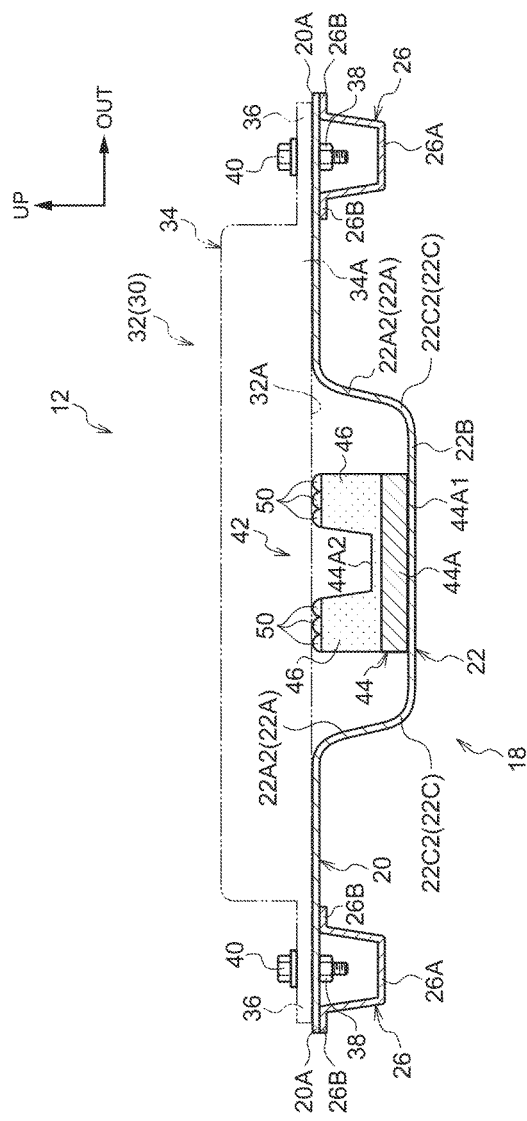
FIG. 1 is a cross-section, illustrating a cut away state along line 1-1 in FIG. 4, of a vehicle rear section applied with a vehicle vibration suppressing structure according to a first exemplary embodiment viewed from a vehicle front side.

The floor pan 22 configures a vehicle rear side portion of the rear floor panel 18, and, as illustrated in FIG. 1, is formed in a concave shape indented further toward the vehicle lower side than the general portion 20. Namely, the floor pan 22 can be understood as a recess formed in the rear floor panel 18. The floor pan 22 includes a surrounding wall portion 22A, a bottom wall portion 22B that configures a vehicle lower side portion of the floor pan 22, and a curved wall portion 22C formed contiguously to the surrounding wall portion 22A and the bottom wall portion 22B. The floor pan 22 is formed such that one vehicle width direction side has symmetry with the other vehicle width direction side.

Figure 2:
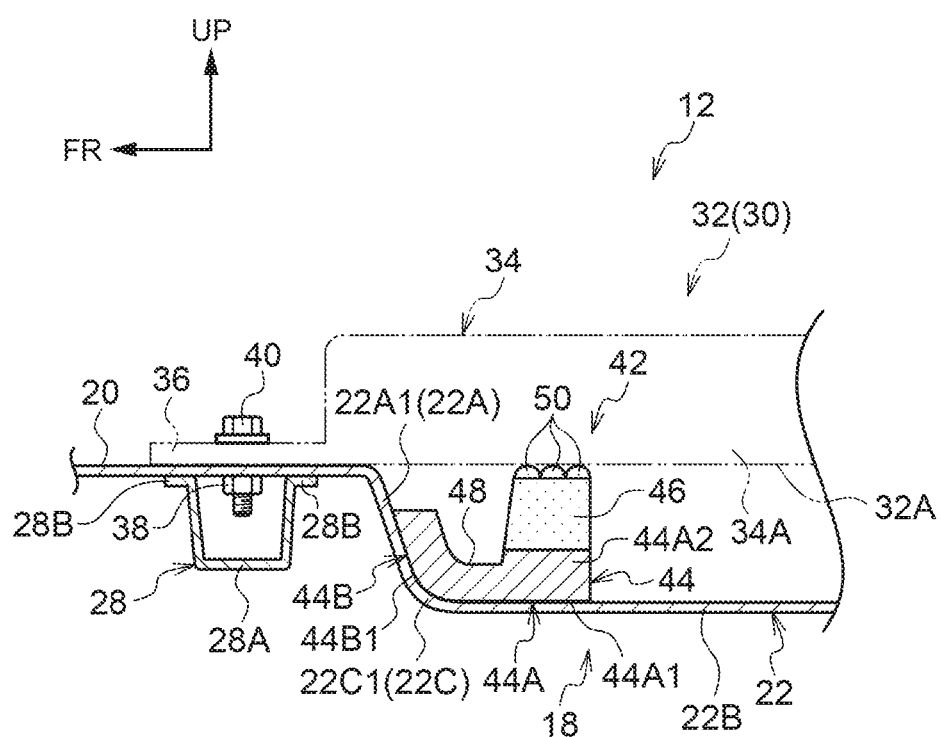
FIG. 2 is a cross-section, illustrating a cut away state along line 2-2 in FIG. 4, of a vehicle rear section applied with a vehicle vibration suppressing structure according to the first exemplary embodiment viewed from a vehicle width direction outside.

As illustrated in FIG. 1, FIG. 2, and FIG. 4, the surrounding wall portion 22A of the floor pan 22 extends from a boundary between the floor pan 22 and the general portion 20, toward the vehicle lower side. The surrounding wall portion 22A includes a front wall portion 22A1 constructing a vehicle front side of the surrounding wall portion 22A, and a pair of side wall portions 22A2 that construct both vehicle width direction sides of the surrounding wall portion 22A and that extend in the vehicle front-rear direction. More precisely, as viewed from the vehicle upper side, the front wall portion 22A1 forms a plate shape that follows a semicircle bulging out to a vehicle front side and a plate thickness direction of the front wall portion 22A1 is substantially the radial direction of the semicircle. The side wall portions 22A2 form plate shapes that extend from a peripheral edge at the vehicle rear side of the front wall portion 22A1 toward a vehicle rear side, such that the plate thickness direction of the side wall portions 22A2 is substantially the vehicle width direction.

The curved wall portion 22C includes a curved front wall portion 22C1 that forms a vehicle front side of the curved wall portion 22C, and curved side wall portions 22C2 that form both vehicle width direction sides of the curved wall portion 22C. More precisely, the curved front wall portion 22C1 is formed along a peripheral edge at a vehicle lower side of the front wall portion 22A1, and a vertical cross-section profile of the curved front wall portion 22C1 forms a curved shape that curves in an arc bulging toward the outer peripheral side and toward the vehicle lower side of the front wall portion 22A1.

The curved side wall portions 22C2 are formed following vehicle lower side peripheral edges of the side wall portions 22A2, and vertical cross-section profiles of the curved side wall portions 22C2 form curved shapes that curve in an arc shape bulging toward the vehicle width direction outside and the vehicle lower side. Namely, the curved wall portions 22C overall curve so as to bulge toward the outside of the floor pan 22.

The bottom wall portion 22B is formed such that the peripheral edge of the bottom wall portion 22B at the vehicle front side is aligned with the vehicle lower side peripheral edge of the curved front wall portion 22C1, and the peripheral edges of the bottom wall portion 22B at both vehicle width direction sides are aligned with the lower side peripheral edges of the curved side wall portions 22C2. Namely as viewed from the vehicle upper side, the bottom wall portion 22B is formed in a plate shape that is semicircular at the vehicle front side and rectangular at the vehicle rear side, and the plate thickness direction of the bottom wall portion 22B is the vehicle up-down direction.

As illustrated in FIG. 1, a pair of rear side members 26, constituted from steel, extend along peripheral edges 20A at both vehicle width direction sides of the general portion 20 of the rear floor panel 18.

The rear side members 26 are disposed at the vehicle lower side of the peripheral edges 20A of the general portion 20 such that the length direction of the rear side members 26 is the vehicle front-rear direction. Each of the rear side members 26 includes a bulging portion 26A and a pair of flange portions 26B, and the cross-section profile of the rear side members 26 form substantial hat shapes open toward the vehicle upper side as viewed along the vehicle front-rear direction. More precisely, each of the bulging portions 26A forms a plate shape formed into a U-shape that bulges toward the vehicle lower side and is open toward the vehicle upper side. The flange portions 26B are provided along the respective peripheral edges at both vehicle width direction sides of the bulging portion 26A, and form rectangular plate shapes in plan view with the vehicle up-down direction as their plate thickness directions. The rear side members 26 are attached to the rear floor panel 18 by joining the rear side members 26 to the rear floor panel 18 using a joining method such as welding, in a state in which the flange portion 26B makes face contact with the rear floor panel 18. The rear side members 26 and the rear floor panel 18 thereby configure a chamber structure extending in the vehicle front-rear direction.

As illustrated in FIG. 2 and FIG. 4, a floor cross member 28, constituted from steel, is provided at the vehicle front side of the floor pan 22 at the general portion 20 extending in the vehicle width direction. The floor cross member 28 is disposed at the vehicle lower side of the general portion 20, and, similarly to the rear side members 26, includes a bulging portion 28A and a pair of flange portions 28B. A cross-section view of the floor cross member 28 forms a substantial hat shape open toward the vehicle upper side as viewed along the vehicle width direction. The floor cross member 28 is attached to the rear floor panel 18 by joining the flange portions 28B to the rear floor panel 18 using a joining method such as welding in a state in which the flange portions 28B make face contact with the rear floor panel 18. The floor cross member 28 and the general portion 20 thereby form a chamber structure extending in the vehicle width direction. A vehicle mounted battery 30 is disposed at the vehicle upper side of the rear floor panel 18, which is configured as described above.

The vehicle mounted battery 30 is, as an example, a battery for a plugin hybrid car, and is configured including a storage case 32 serving as a storage section, and plural battery modules, not illustrated in the drawings, serving as storage objects stored in the storage case 32. An array of plural battery cells, such as a nickel hydride battery or a lithium ion battery (a secondary battery) are housed in the interior of the battery modules.

The storage case 32 is made from die cast aluminum, and includes a main body 34 formed as a rectangular box as viewed from the vehicle upper side, and plural attachments 36 provided at the vehicle front side and both vehicle width direction side peripheral edges of a bottom wall portion 34A of the main body 34. The main body 34 is formed large enough to cover the floor pan 22 as viewed from the vehicle upper side. Here, "large enough to cover the floor pan 22" includes configurations in which the floor pan 22 is not completely closed off by the storage case 32 as viewed from the vehicle upper side.

An insertion portion, not illustrated in the drawings, is formed to each of the attachments 36, and, as illustrated in FIG. 1 and FIG. 2, weld nuts 38 corresponding to the insertion portions are provided at a vehicle lower side face of the general portion 20 of the rear floor panel 18. Bolts 40 (fastening members) are inserted into each of the insertion portions of the attachment 36 from the vehicle upper side, and screwed into the weld nuts 38 such that the storage case 32 is attached to the general portion 20 in a state in which the floor pan 22 is covered as viewed from the vehicle upper side. The weld nuts 38 are disposed at positions overlapping the rear side members 26 and the floor cross member 28 of the general portion 20 as viewed along the vehicle up-down direction. Namely, the vehicle mounted battery 30 is attached to a location at the vehicle body rear section 14 at which the chamber structure is disposed by the rear floor panel 18 and the rear side members 26, and the rear floor panel 18 and the floor cross member 28. The location where the chamber structure is disposed is a highly rigid portion in the vehicle body rear section 14.

In the present exemplary embodiment, a foaming material 42 serving as a vibration suppressing portion is interposed between a lower face 32A of the storage case 32 and the bottom wall portion 22B of the floor pan 22. Detailed explanation follows regarding the foaming material 42.

Figure 3:
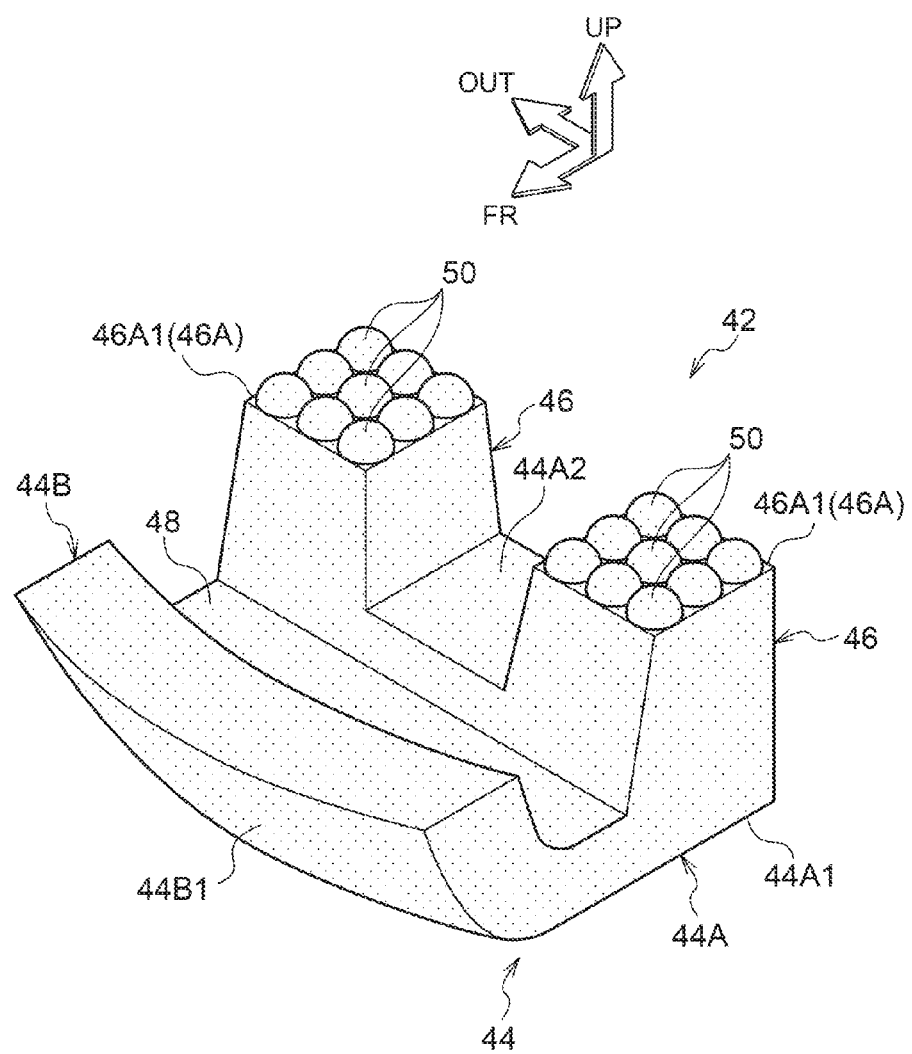
FIG. 3 is a perspective view illustrating a construction of a foaming material configuring a vehicle vibration suppressing structure according to the first exemplary embodiment.

As illustrated in FIG. 1 to FIG. 3, the foaming material 42 includes a lower side abutting portion 44 that abuts the floor pan 22, and a pair of upper side abutting portions 46 that abut the vehicle mounted battery 30. The foaming material 42 is constituted from a foaming resin, such as urethane foam or styrene foam, so as to be elastically deformable.

The lower side abutting portion 44 is formed including a bottom wall portion side abutting region 44A mostly disposed along the bottom wall portion 22B of the floor pan 22, and a curved wall portion side abutting region 44B disposed mostly along the curved front wall portion 22C1 of the floor pan 22. More specifically, the bottom wall portion side abutting region 44A and the curved wall portion side abutting region 44B are formed with a specific thickness, and are formed such that the curved wall portion side abutting region 44B extends out from one side of the bottom wall portion side abutting region 44A. A lower face 44A1 of the bottom wall portion side abutting region 44A has a shape capable of face contact with the bottom wall portion 22B. In other words, the lower face 44A1 has a planar shape. A lower face 44B1 of the curved wall portion side abutting region 44B has a shape capable of face contact with the curved front wall portion 22C1. In other words, the lower face 44B1 has a curved face shape.

Another side of the bottom wall portion side abutting region 44A is raised in a thickness direction of the bottom wall portion side abutting region 44A in a rectangular block shape (referred to as the raised portion 44A2 hereafter), and a recess 48 is formed between the curved wall portion side abutting region 44B and the raised portion 44A2. In a state in which the foaming material 42 is disposed in the floor pan 22, the lower side abutting portion 44, configured as described above, forms a rectangular shape in which the vehicle front side is semicircular as viewed from the vehicle upper side. Upper side abutting portions 46 are provided at the raised portion 44A2 of the lower side abutting portion 44.

In the state in which the foaming material 42 is disposed in the floor pan 22, the upper side abutting portions 46 are provided disposed such there is a space between the respective upper side abutting portions 46 along the vehicle width direction. The upper side abutting portions 46 are made as rectangular pillar shapes having their length directions along the vehicle up-down direction, and plural projections 50 are provided at upper faces 46A1 of leading end portions 46A of the upper side abutting portions 46.

The projections 50 project from the upper faces 46A1 of the upper side abutting portions 46, and in total, nine projections 50 are placed in three rows having even placement pitches along an edge of the upper face 46A1, and in three rows having even placement pitches along an edge orthogonal to that edge. The projections 50 are each shaped as a half sphere, and the apex of each of the projections 50 abuts the lower face 32A of the storage case 32.

As illustrated in FIG. 4, the curved wall portion side abutting region 44B of the foaming material 42, configured as described above, is disposed at a position abutting a vehicle width direction central portion of the curved front wall portion 22C1 of the floor pan 22, and is installed on the bottom wall portion 22B.

More precisely, the foaming material 42 undergoes compression deformation due to being pressed by the vehicle mounted battery 30 from the vehicle upper side, and is fixed by friction generated between the lower face 32A of the storage case 32 and the bottom wall portion 22B of the floor pan 22. When this occurs, a state is adopted in which the lower face 44A1 of the bottom wall portion side abutting region 44A of the foaming material 42 makes face contact with the bottom wall portion 22B, and the lower face 44B1 of the curved wall portion side abutting region 44B makes face contact with the curved front wall portion 22C1. Although the curved wall portion side abutting region 44B is also disposed on a front wall portion 22A1 side in addition to a curved front wall portion 22C1 side, the curved wall portion side abutting region 44B can be made to follow the front wall portion 22A1 due to the curved wall portion side abutting region 44B undergoing compression deformation toward a recess 48 side. The upper side abutting portions 46 adopt a state of point-contact with the lower face 32A at plural locations since the projections 50 of the upper side abutting portions 46 abut the lower face 32A of the storage case 32.

Operation and Advantageous Effects of Present Exemplary Embodiment

Next, explanation follows regarding operation and advantageous effects of the present exemplary embodiment.

As illustrated in FIG. 1, in the present exemplary embodiment, the rear floor panel 18, which configures part of the vehicle body 12, is constructed including the general portion 20 extending in the vehicle front-rear direction and the vehicle width direction, and the floor pan 22 provided contiguously to the general portion 20. The floor pan 22 is formed in a concave shape indented toward the vehicle lower side enabling various members to be stored inside the floor pan 22.

For example, it is conceivable that a storage case capable of storing the battery modules could be stored in the floor pan 22. In this configuration, the bottom wall portion 22B of the floor pan 22 is pressed by the load of the storage case and the battery modules stored therein, and, as a result, vibrations can be suppressed from occurring in the floor pan 22. However, when the storage case is a size not storable in the floor pan 22, the bottom wall portion 22B of the floor pan 22 is no longer pressed, and it becomes difficult to suppress vibrations from occurring in the floor pan 22.

In the present exemplary embodiment, the storage case 32 of the vehicle mounted battery 30 covers the floor pan 22 as viewed from the vehicle upper side and is attached to the general portion 20 of the rear floor panel 18. Namely, although the physical volume of the storage case 32 can be set larger than in cases in which the storage case 32 is a size storable in the floor pan 22 in the present exemplary embodiment, it is difficult to press the bottom wall portion 22B of the floor pan 22 directly using the storage case 32.

In the present exemplary embodiment, the foaming material 42 is disposed between the lower face 32A of the storage case 32 and the bottom wall portion 22B of the floor pan 22 in a state of contact with the lower face 32A and the bottom wall portion 22B. Thus, the storage case 32 can press the bottom wall portion 22B of the floor pan 22 through the foaming material 42. Accordingly, in the present exemplary embodiment, vibrations can be suppressed from occurring in the floor pan 22 even when the storage case 32 that stores the battery modules has a size not storable in the floor pan 22.

In the present exemplary embodiment, the floor pan 22 is formed including the surrounding wall portion 22A, and the curved wall portion 22C that is formed contiguously to the surrounding wall portion 22A and the bottom wall portion 22B. The surrounding wall portion 22A extends from the boundary between the floor pan 22 and the general portion 20 of the rear floor panel 18 toward the vehicle lower side, and the curved wall portion 22C curves so as to bulge toward the outside of the floor pan 22. The curved wall portion 22C is therefore influenced by vibrations substantially in the vehicle up-down direction generated at the bottom wall portion 22B, and vibrations substantially in the vehicle front-rear direction and the vehicle width direction generated at the surrounding wall portion 22A. In the present exemplary embodiment, the lower face 44B1 of the foaming material 42 makes face contact, with the curved wall portion 22C of the floor pan 22 such that the storage case 32 can press the bottom wall portion 22B and the curved wall portion 22C of the floor pan 22 through the foaming material 42. As a result, reaction forces can be given counter to vibrations of the floor pan 22 in various directions. Accordingly, in the present exemplary embodiment, even when vibrations are generated in various directions at the floor pan 22, the vibrations can be stabilized and suppressed. Since large vibrations are generally liable to be generated in the vehicle width direction central portion of the curved front wall portion 22C1 of the floor pan 22, the curved wall portion side abutting region 44B of the foaming material 42 is caused to abut this portion in the present exemplary embodiment. Such a configuration achieves higher effectiveness for suppressing vibrations in the floor pan 22 using the foaming material 42, and achieves a decrease in the scale of the foaming material 42.

In the present exemplary embodiment, weight can be reduced compared to cases in which the foaming material 42 is constituted from a metal or the like since the foaming material 42 is constituted from a resin. Plural projections 50 are provided so as to project from the upper face 46A1 of the foaming material 42, and the projections 50 abut the lower face 32A of the storage case 32. This increases the abutting pressure between the lower face 32A and the upper face 46A1 compared to cases in which the upper face 46A1 is configured as a planar shape. As a result, in a state in which the lower face 32A of the storage case 32 contacts the upper face 46A1 of the foaming material 42, the upper face 46A1 is suppressed from moving relative to the lower face 32A. Accordingly, in the present exemplary embodiment, the influence of the weight of the foaming material 42 on the vibrations of the floor pan 22 can be reduced, and generation of abnormal noise caused by the lower face 32A of the storage case 32 rubbing against the upper face 46A1 of the foaming material 42 can also be suppressed.

In addition, in the present exemplary embodiment, the vehicle mounted battery 30 includes plural battery modules and the storage case 32 that stores the battery modules. The vehicle mounted battery 30 can therefore be employed as a power source in a hybrid car or a plugin hybrid car.

When the vehicle mounted battery 30 is a size storable in the floor pan 22, the bottom wall portion of the floor pan 22 can be pressed by the load of the vehicle mounted battery 30 as explained above, and, as a result, vibrations can be suppressed from occurring in the floor pan 22.

However, in cases in which the vehicle mounted battery 30 has a large physical volume, like those employed in plugin hybrid cars, the vehicle mounted battery 30 is difficult to store in the floor pan 22. As a result, it is conceivable that vibrations become difficult to suppress from occurring in the floor pan 22. Although it is conceivable that the floor pan 22 could be configured capable of storing a vehicle mounted battery of large physical volume, it would then be necessary to modify the configuration of the floor pan 22, and thus the vehicle body 12.

In the present exemplary embodiment, the storage case 32 of the vehicle mounted battery 30 can press against the bottom wall portion 22B of the floor pan 22 through the foaming material 42. Thus, even when the vehicle mounted battery 30 is a size not storable in the floor pan 22, vibrations can be suppressed from occurring in the floor pan 22 while maintaining the configuration of the floor pan 22. Accordingly, in the present exemplary embodiment, vibrations can be suppressed from occurring in the floor pan 22 without modifying the configuration of the floor pan 22 even when a vehicle mounted battery 30 of large physical volume is employed.

Second Exemplary Embodiment

Figure 5:
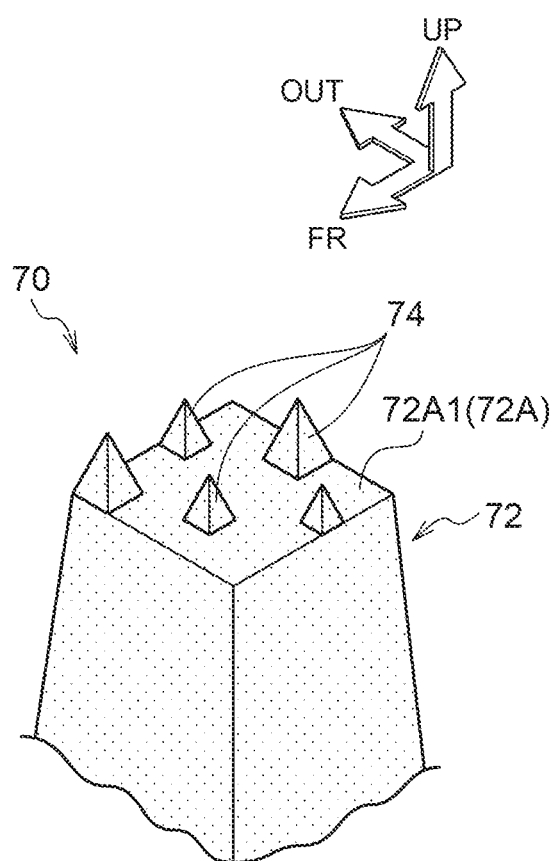
FIG. 5 is an enlarged perspective view illustrating a construction of an upper side abutting portion of a foaming material configuring a vehicle vibration suppressing structure according to a second exemplary embodiment.

Next, explanation follows regarding a configuration of a vehicle vibration suppressing structure of a second exemplary embodiment according to the present invention, with reference to FIG. 5. In a foaming material 70 illustrated in FIG. 5, portions other than an upper side abutting portion 72 are configured similarly to those of the foaming material 42 of the first exemplary embodiment described above, and so only the upper side abutting portion 72 is illustrated in the drawings.

The second exemplary embodiment differs from the first exemplary embodiment described above in that the shape of projections 74, formed on an upper face 72A1 of a leading end portion 72A of the upper side abutting portion 72, are square pyramid shapes. More specifically, plural projections 74 formed on the upper face 72A1 of the upper side abutting portion 72 are each formed at different sizes falling within a specific range, and their installation positions are arbitrarily set.

In the foaming material 70 configured as described above, even when the lower face 32A of the storage case 32 is formed with undulations, the projections 74 elastically deform as they enter the undulations, thereby suppressing movement of the upper face 72A1 of the upper side abutting portion 72 relative to the lower face 32A of the storage case 32. The present exemplary embodiment therefore exhibits similar operation and advantageous effects as in the first exemplary embodiment described above, even when the storage case 32 is formed with undulations on the lower face 32A.

Third Exemplary Embodiment

Figure 6:
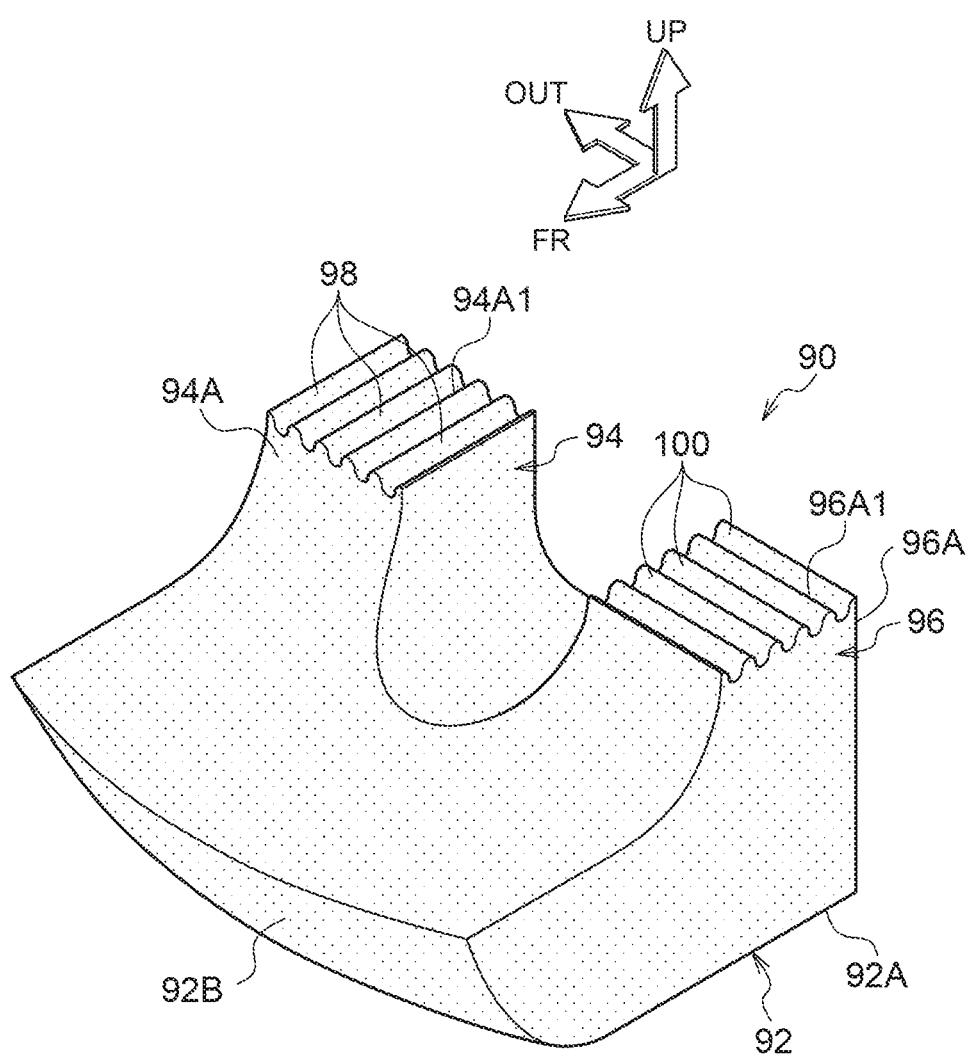
FIG. 6 is a perspective view illustrating a construction of a foaming material configuring a vehicle vibration suppressing structure according to a third exemplary embodiment.

Next, explanation follows regarding a configuration of a vehicle vibration suppressing structure of a third exemplary embodiment according to the present invention, with reference to FIG. 6. Other than a foaming material 90, the configuration of the present exemplary embodiment is similar to the configuration of the first exemplary embodiment described above, and elements other than the foaming material 90 are therefore omitted from illustration in FIG. 6.

Similarly to the foaming material 42 according to the first exemplary embodiment, the foaming material 90 is formed including a lower side abutting portion 92 and a pair of upper side abutting portions 94, 96, and the lower side abutting portion 92 and the upper side abutting portions 94, 96 are configured differently to those of foaming material 42.

To explain more specifically, the lower side abutting portion 92 is essentially configured similarly to the lower side abutting portion 44 of the first exemplary embodiment, but unlike the lower side abutting portion 44, is not formed with the recess 48. Namely, the lower side abutting portion 92 is essentially a block shape having uniform thickness in the vehicle front-rear direction and the vehicle width direction, and is formed including a lower face 92A capable of making face contact with the bottom wall portion 22B of the floor pan 22 and a lower face 92B capable of making face contact with the curved front wall portion 22C1.

As viewed along the vehicle width direction, the upper side abutting portions 94, 96 gradually widen in width on progression toward the vehicle front side and toward the lower side abutting portion 92 from leading end portions 94A, 96A thereof, and a boundary between the upper side abutting portions 94, 96 and the lower side abutting portion 92 at the vehicle front side is shaped as a curved face. As viewed along the vehicle front-rear direction, the upper side abutting portion 94 widens in width from the leading end portion 94A thereof on progression toward the lower side abutting portion 92, and, similarly, the upper side abutting portion 96 widens in width from the leading end portion 96A thereof on progression toward the lower side abutting portion 92.

Plural ribs 98, serving as projections, formed extending in the vehicle front-rear direction and formed with triangular shapes as viewed in vertical cross-section, are provided at an upper face 94A1 of the leading end portion 94A of the upper side abutting portion 94. Plural ribs 100, serving as projections formed extending in the vehicle width direction and formed with triangular shapes as viewed in vertical cross-section, are provided at an upper face 96A1 of the leading end portion 96A of the upper side abutting portion 96.

In the foaming material 90 formed as described above, the ribs 98, 100 form triangular shapes as viewed in vertical cross-section, such that the contact pressure between the lower face 32A of the storage case 32 and the upper faces 94A1, 96A1 of the upper side abutting portions 94, 96 is increased. Accordingly, the present exemplary embodiment also exhibits similar operation and advantageous effects to those of the first exemplary embodiment described above.

In the present exemplary embodiment, the lower side abutting portion 92 has uniform thickness in the vehicle front-rear direction and the vehicle width direction, and the upper side abutting portions 94, 96 gradually widen in width from the leading end portions 94A, 96A thereof, toward the lower side abutting portion 92. The pressing force from the storage case 32 can accordingly be suppressed from acting unevenly on the lower faces 92A, 92B of the lower side abutting portion 92.

In the present exemplary embodiment, the ribs 98 provided at the upper side abutting portion 94 extend in the vehicle front-rear direction. Thus, the upper side abutting portion 94 does not easily receive a resistance force from the storage case 32 when the upper side abutting portions 94 moves in the vehicle front-rear direction relative to the storage case 32; however, the upper side abutting portions 94 easily receives the resistance force from the storage case 32 when the upper side abutting portions 94 moves in the vehicle width direction relative to the storage case 32. The ribs 100 provided at the upper side abutting portion 96 extend in the vehicle width direction. Thus, the upper side abutting portion 96 does not easily receive the resistance force from the storage case 32 when the upper side abutting portion 96 moves in the vehicle width direction relative to the storage case 32; however, the upper side abutting portion 96 easily receives the resistance force from the storage case 32 when the upper side abutting portion 96 moves in the vehicle front-rear direction relative to the storage case 32. Accordingly, when the floor pan 22 has vibrated, the resistance force that the upper side abutting portions 94, 96 receive from the storage case 32 operates in different directions such that the attachment position of the foaming material 90 can be suppressed from being offset by the vibrations of the floor pan 22.

Supplementary Explanation of Above Exemplary Embodiments (1) Although the foaming material is disposed at a position abutting the vehicle width direction central portion of the curved front wall portion 22C1 of the floor pan 22 in the exemplary embodiments described above, there is no limitation thereto. Namely, the foaming material may be disposed so as to abut the bottom wall portion 22B and the curved side wall portions 22C2. Moreover, the foaming material may be formed as a shape capable of abutting the curved front wall portion 22C1 and the curved side wall portions 22C2 of the floor pan 22, or plural foaming materials may each abut the curved front wall portion 22C1 and the curved side wall portions 22C2.

(2) Although the foaming material includes an upper side abutting portion and a lower side abutting portion in the exemplary embodiments above, there is no limitation thereto. As an example, the foaming material may be formed with a circular pillar shape, and any of the projections described above are provided on both of the end faces of the foaming material.

(3) Although the vibration suppressing portion is configured from a resin in the exemplary embodiments described above, the vibration suppressing portion may be configured from a metal. As an example, the vibration suppressing portion may be configured from a steel I beam, and flange portions thereof contact the lower face 32A of the storage case 32 and the bottom wall portion 22B of the floor pan 22. Moreover, rubber plates are provided on the surfaces of the flange portions.

(4) In addition, although the vehicle vibration suppressing structure is applied to a vehicle 10 in which the vehicle mounted battery 30 is disposed at the vehicle upper side of the rear floor panel 18 in the exemplary embodiments described above, there is no limitation thereto. For example, the vehicle vibration suppressing structure according to the exemplary embodiments described above may also be applied to a vehicle in which a large scale storage box that stores a tool or the like is disposed at the vehicle upper side of a rear floor panel.

(5) Although the first exemplary embodiment described above has a configuration in which the projections 50 are provided at the foaming material 42, the ribs 98, 100 may be provided instead of the projections 50. Although the ribs 98, 100 are provided at the foaming material 90 in the third exemplary embodiment described above, the projections 50 or the projections 74 are provided instead of the ribs 98, 100. The foaming material 90 may be provided with the ribs 98 or the ribs 100 on both of the upper side abutting portions 94, 96.

What is claimed is:

1. A vehicle vibration suppressing structure comprising:
    a floor panel configuring part of a vehicle body and including:
        a general portion that extends in a vehicle front-rear direction and a vehicle width direction, and
        a floor pan that is provided contiguously to the general portion and that is formed in a concave shape indented toward a vehicle lower side;
    a storage section that covers the floor pan as viewed from a vehicle upper side, that is attached to the general portion, and that is capable of storing a storage object; and
    a vibration suppressing section that is disposed between a lower face of the storage section and a bottom wall portion of the floor pan in a state of contact with the lower face and the bottom wall portion,
    wherein the floor pan further includes:
        a surrounding wall portion that extends toward the vehicle lower side from a boundary between the floor pan and the general portion, and that configures a surrounding wall of the floor pan, and
        a curved wall portion that is formed contiguously to each of the surrounding wall portion and the bottom wall portion, and that is curved so as to bulge toward an outer side of the floor pan,
    wherein a lower face of the vibration suppressing structure is in face contact with the curved wall portion,
    wherein the vibration suppressing section includes a lower side abutting portion, and a pair of upper side abutting portions abutting the storage section,
    wherein the lower side abutting portion includes a bottom wall region, and a curved wall portion side abutting region extending upwards from the bottom wall region, and
    wherein the curved wall portion side abutting region is disposed at a position abutting a vehicle width direction central portion of a curved wall portion of the floor pan, the lower face of the curved wall portion side abutting region is in face contact with the curved wall portion of the floor pan, and the bottom wall region is mounted on the bottom wall portion of the floor pan.

2. The vehicle vibration suppressing structure of claim 1, wherein:
the vibration suppressing section is constituted from a resin; and
a plurality of projections are provided at upper faces of the pair of upper side abutting portions of the vibration suppressing section so as to project out from the upper faces, and the plurality of projections abut the lower face of the storage section.

3. The vehicle vibration suppressing structure of claim 2, wherein:
the lower side abutting portion is formed in a block shape having a substantially uniform thickness in the vehicle front-rear direction and in the vehicle width direction; and
horizontal dimensions of the pair of upper side abutting portions gradually widen in the vehicle forward direction and in the vehicle width direction from respective leading end portions of the upper side abutting portions to the lower side abutting portion.

4. The vehicle vibration suppressing structure of claim 1, wherein
the storage object is a plurality of battery modules that configure a vehicle mounted battery, and the storage section is a storage case that stores the battery modules.

5. The vehicle vibration suppressing structure of claim 1, wherein
the vibration suppressing section is disposed in a position abutting a vehicle width direction central portion of the curved wall portion of the floor pan.

6. The vehicle vibration suppressing structure of claim 3, wherein:
the plurality of projections include a first plurality of ribs extending along the vehicle front-rear direction, and having triangular shapes as viewed in vertical cross-section at an upper face of either one of the pair of upper side abutting portions; and
the plurality of projections includes a second plurality of ribs extending along the vehicle width direction, and having triangular shapes as viewed in vertical cross-section at the upper face of the other upper side abutting portion.

* * * * *